United States Patent [19]

Roinestad et al.

[11] Patent Number: 5,141,102

[45] Date of Patent: * Aug. 25, 1992

[54] CONVEYOR BELT AND SYSTEM WITH A NON-COLLAPSING INSIDE EDGE

[75] Inventors: Gerald C. Roinestad, Williamsburg; Michael R. Straight, Winchester, both of Va.

[73] Assignee: Ashworth Bros., Inc., Fall River, Mass.

[ * ] Notice: The portion of the term of this patent subsequent to Sep. 19, 2006 has been disclaimed.

[21] Appl. No.: 810,435

[22] Filed: Dec. 19, 1991

Related U.S. Application Data

[63] Continuation of Ser. No. 547,947, Jul. 3, 1990, abandoned, which is a continuation of Ser. No. 224,696, Jul. 27, 1988, Pat. No. 4,940,133, which is a continuation-in-part of Ser. No. 171,390, Mar. 21, 1988, Pat. No. 4,867,301, which is a continuation-in-part of Ser. No. 83,272, Aug. 10, 1987, abandoned, said Ser. No. 224,696, is also a continuation-in-part of Ser. No. 213,171, Jun 29, 1988, Pat. No. 4,951,807, which is a continuation-in-part of Ser. No. 213,171, Jun. 29, 1988, Pat. No. 4,951,807, which is a continuation-in-part of Ser. 171,390, Mar. 21, 1988, Pat. No. 4,867,301, and a continuation-in-part of Ser. No. 83,272, Aug. 10, 1987, abandoned.

[51] Int. Cl.⁵ .............................................. B65G 17/06
[52] U.S. Cl. ................................... 198/852; 198/831; 198/778
[58] Field of Search ........ 198/778, 831, 849, 851–853; 62/381

[56] References Cited

U.S. PATENT DOCUMENTS

| | | | |
|---|---|---|---|
| Re. 27,690 | 7/1973 | Roinestad et al. | 198/193 |
| 723,325 | 3/1903 | Souder . | |
| 792,623 | 6/1905 | Souder . | |
| 1,626,492 | 4/1927 | Youngson . | |
| 2,219,724 | 10/1940 | Quick | 198/181 |
| 2,278,361 | 3/1942 | Rapisarda | 198/182 |
| 2,706,033 | 4/1955 | Williams | 198/182 |
| 2,872,023 | 2/1959 | Bechtel, Jr. | 198/182 |
| 3,133,798 | 5/1964 | Feld et al. | 34/187 |
| 3,225,898 | 12/1965 | Roinestad | 198/181 |
| 3,261,451 | 7/1966 | Roinestad | 198/193 |
| 3,270,863 | 9/1966 | Ackles | 198/203 |
| 3,315,492 | 4/1967 | Dreksler | 62/381 |
| 3,319,778 | 5/1967 | Bessant | 198/182 |
| 3,348,659 | 10/1967 | Roinestad et al. | 198/136 |
| 3,391,548 | 7/1968 | Gram | 62/381 |
| 3,412,476 | 11/1968 | Astrom | 34/147 |
| 3,439,795 | 4/1969 | Roinestad et al. | 198/193 |
| 3,467,239 | 9/1969 | Roinestad | 198/195 |
| 3,659,697 | 5/1972 | Brackmann et al. | 198/136 |
| 3,664,487 | 5/1972 | Ballenger | 198/136 |
| 3,733,848 | 5/1973 | Duron et al. | 62/381 |
| 3,750,859 | 8/1973 | Smith | 198/136 |
| 3,794,156 | 2/1974 | Brackmann et al. | 198/136 |
| 3,920,117 | 11/1975 | Roinestad | 198/194 |
| 3,938,651 | 2/1976 | Alfred et al. | 198/136 |
| 4,023,381 | 5/1977 | Onodera | 62/381 |
| 4,036,352 | 7/1977 | White | 198/778 |
| 4,078,655 | 3/1978 | Roinestad | 198/848 |
| 4,103,768 | 8/1978 | Persson | 198/778 |
| 4,118,181 | 10/1978 | Onodera | 432/121 |
| 4,222,483 | 9/1980 | Wootton et al. | 198/831 |
| 4,260,053 | 4/1981 | Onodera | 198/812 |
| 4,333,318 | 6/1982 | Tyree, Jr. | 62/374 |
| 4,440,367 | 4/1984 | Daringer | 245/6 |
| 4,444,248 | 4/1984 | Hirosuke | 165/120 |
| 4,448,301 | 5/1984 | Alger | 198/778 |
| 4,450,953 | 5/1984 | Le Cann et al. | 198/778 |
| 4,557,374 | 12/1985 | Bode | 198/852 |
| 4,565,282 | 1/1986 | Olsson et al. | 198/778 |
| 4,603,776 | 8/1986 | Olsson | 198/778 |
| 4,662,509 | 5/1987 | Kaak | 198/792 |
| 4,741,430 | 5/1988 | Roinestad | 198/778 |
| 4,858,750 | 8/1989 | Cawley | 198/778 |
| 4,867,301 | 9/1989 | Roinestad et al. | 198/852 |
| 4,875,343 | 10/1989 | Jeppsson | 62/381 |
| 4,878,362 | 11/1989 | Tyree, Jr. | 62/381 |
| 4,932,925 | 6/1990 | Roinestad et al. | 474/206 |
| 4,940,133 | 7/1990 | Roinestad et al. | 198/831 |
| 4,951,807 | 8/1990 | Roinestad et al. | 198/852 |
| 4,955,465 | 9/1990 | Straight et al. | 198/778 |

FOREIGN PATENT DOCUMENTS

| | | |
|---|---|---|
| 1090630 | 11/1967 | United Kingdom . |
| 1301655 | 1/1973 | United Kingdom . |
| 1330282 | 9/1973 | United Kingdom . |
| 2072123 | 9/1981 | United Kingdom . |
| 87-11022 | 5/1987 | United Kingdom . |
| 87-11023 | 5/1987 | United Kingdom . |

OTHER PUBLICATIONS

Exhibit D: prior art brochure 'Chain Driven Belts'.
Exhibit A: European Search Report from corresponding European Patent Application No. EP 88307384.3.
Exhibit B: Ashworth Small Radius Omniflex ® Belt brochure. See p. 5, FIG. 3.
Exhibit C: Frigoscandia's Gyrofreeze C brochure.

*Primary Examiner*—Joseph E. Valenza
*Attorney, Agent, or Firm*—Banner, Birch, McKie & Beckett

[57] ABSTRACT

A conveyor belt and conveying system designed to operate about lateral curves is disclosed. The conveyor belt is comprised of transverse rods interconnected by links disposed along opposite transverse edges of the belt. When the belt proceeds about a lateral curve, the pitch along the inside edge of the curve is kept substantially the same as in straight line motion, while the outside edge of the belt is allowed to expand to a second greater pitch. In one embodiment support links are disposed along the inside edge of the belt and provide support for the inside edge of successive tiers of the belt as the belt travels a helical path. A specific link construction which uses a worked hardened bearing surface is also disclosed.

56 Claims, 9 Drawing Sheets

CONVEYOR BELT AND SYSTEM WITH A NON-COLLAPSING INSIDE EDGE

RELATED APPLICATIONS

This application is a continuation of application Ser. No. 547,947, filed Jul. 3, 1990, abandoned. Application Ser. No. 547,947 is a continuation of application Ser. No. 224,696, filed Jul. 27, 1988, now U.S. Pat. No. 4,940,133. Application Ser. No. 224,696, filed Jul. 27, 1988, now U.S. Pat. No. 4,940,133, is a continuation-in-part of application Ser. No. 171,390, filed Mar. 21, 1988, now U.S. Pat. No. 4,867,301, which in turn is a continuation-in-part of application Ser. No. 83,272, filed Aug. 10, 1987, abandoned. Application Ser. No. 224,696, filed Jul. 27, 1988, now U.S. Pat. No. 4,940,133, is also a continuation-in-part of application Ser. No. 213,171, filed Jun. 29, 1988, now U.S. Pat. No. 4,951,807, which in turn is a continuation-in-part of application Ser. No. 171,390, filed Mar. 21, 1988, now U.S. Pat. No. 4,867,301, and a continuation-in-part of application Ser. No. 83,272, filed Aug. 10, 1987, abandoned.

TECHNICAL FIELD

This invention relates to a conveyor belt and system designed to travel about lateral curves. More specifically, the invention concerns a conveyor belt which includes transverse rods connected by links disposed along the opposite transverse ends of the rods, wherein the inside ends of the rods along the inside edge of the belt are kept at a constant first pitch and the outside ends of the rods are allowed to move to a second larger pitch.

BACKGROUND OF THE INVENTION

Conveyor belts comprised of transverse rods connected by links disposed along the opposite transverse edges of the belt have been in use for a long period of time. One such prior art belt uses generally U-shaped nestable links with slotted holes that allow the links to slide on the rods. The relative sliding action between the links and rods provides lateral flexibility which enables the belt to turn right or left, when such nestable links are used on both sides of the belt. When such a belt proceeds around a lateral curve, the rod ends along the inside concave edge of the belt collapse. The opposite transverse ends of the rods along the outside convex edge of the belt either remain at the same pitch as when the belt travels in a straight line direction, such as disclosed in U.S. Pat. No. 3,225,898 to Roinestad, or expand to a greater pitch in order to allow the belt to proceed around a smaller radius, as disclosed in U.S. Pat. No. 4,078,655 to Roinestad.

The collapsing or diminishing pitch of the belt along the inside edge of a lateral curve creates several problems. First of all, most ware is charged into a conveying system in a rank and file arrangement, and spacing of the ranks (crosswise rows) can only be controlled by adjusting the relative speeds of the individual feed conveyors. To make certain that the ware does not overlap, it is necessary to take into account the collapsing pitch and to also leave a safety margin in the spacing, both of which result in a drop in efficiency. If the ware being conveyed is soft in nature, the collapsing pitch can result in wrinkling of the ware. Also, if the conveyor is used in a freezing plant, the collapsing pitch can result in contact and freezing together of adjacent ware is sufficient spacing is not used.

U.S. Pat. No. 4,662,509 issued to Kaak on May 5, 1987 addresses the problem of a conveyor belt having a collapsing inner edge in a chain type conveyor belt wherein the ware support carriers are connected directly to a drive chain. The chain conveyor belt in the '509 patent uses triangular carriers consisting of a rod-shaped element and a pulling element. Along the inside edge of the conveyor belt, the rod-shaped element and the pulling element are pivotably connected to the drive chain, and the pitch of the rod-shaped elements is held constant by the connection to the drive chain. The pulling elements slant backward in the direction of travel of the belt and are pivotably connected to one of the rod-shaped elements further rearward along the belt. As the belt proceeds around a curve, the outside, free ends of the rod-shaped elements increase their spacing or pitch with respect to one another.

The conveyor belt disclosed in the '509 patent, however, has certain disadvantages or limitations. The triangular configuration of the ware carriers precludes negotiation about end pulleys or rolls, or operating through a vertical hanging take-up mechanism. The practical width of the ware carriers is limited by the triangular configuration, because the effectiveness of the pulling element diminishes with increasing width. Finally, the overlapping orientation of the pulling and rod-shaped elements gives rise to serious sanitation difficulties. The capability to clean between all elements of a belt is important when the conveyor belt is used in a food handling environment.

It has also been discovered that the use of a link mechanism which keeps the inside rod ends at a constant pitch along the inner concave edge of a belt, both with dual pitch links and with nestable U-shaped outside links is particularly suitable for use in a conveying system wherein the belt travels along a helical path with the belt being arranged in a number of superimposed helically extending tiers. Prior art helical tier systems, such as disclosed in U.S. Pat. Nos. 3,348,659 and 4,078,655 to Gerald C. Roinestad have used conveying belts with a collapsing inner edge. The successive tiers of belt in the '659 and '655 patents are supported by a support frame separate from the belt. The minimum tier height in such a system is equal to the sum of the heights of the separate belt support frame, the ware being conveyed and the belt, resulting in a system with a relatively large vertical extent. U.S. Pat. No. 3,938,651 to Alfred et al. discloses a conveying system for conveying in a helical path wherein the belt is self-supporting along both the inner and outer edges of the belt.

Another aspect of the invention is directed to the construction of the U-shaped links, particularly the construction of the portion connecting the legs of the link. It has been known in the prior art to curve the bearing surface of the connecting portion of U-shaped links. For example, the bearing surface of certain pintle chain links manufactured by the Allied-Locke Industries, Incorporated are curved. However, such prior art curved bearing surfaces for tractive links do not substantially increase the wear characteristics of the links in the manner of the present invention.

SUMMARY OF THE INVENTION

The present invention is directed to a conveyor belt for conveying around lateral curves. The lateral curves have a predetermined maximum curvature with a predetermined radius of curvature. The belt is comprised of a plurality of rods and a mechanism for connecting the rods to form a length of belt. The rods extend transversely of the length of the belt between an inside end along the inside edge of the lateral curves and an outside end along the outside edge of the lateral curves. The rods are arranged adjacent one another along the length of the belt. The connecting mechanism includes a link mechanism disposed adjacent the inside and outside ends of the rods for coupling adjacent pairs of rods to one another. The link mechanism also keeps the inside and outside ends of the rods at substantially the same pitch during straight line motion of the belt. During motion of the belt about a lateral curve, the link mechanism keeps the inside ends of the rods at the first pitch and allows the outside ends of the rods to move to a second greater pitch as the belt moves from straight line to lateral curved motion and to return to the first pitch as the belt moves from the lateral curved to straight line motion. The link mechanism includes, along the inside concave edge of the belt, a plurality of separate inside links joining each pair of adjacent rods and, along the outside convex edge of the belt, at least one outside link joining each pair of adjacent rods. Each of the outside links has holes through which the rods extend including at least one slot to allow the outside ends of the rods to move to the second pitch. Each of the inside links includes holes having end surfaces spaced a predetermined distance such that a plurality of the inside links joining adjacent rods aligns the adjacent rods in a generally parallel relation at the first pitch when the belt is under tractive load in straight line conveying motion.

In a preferred embodiment of the invention, the inside links include at least two generally U-shaped links joining adjacent pairs of the rods, and the outside links include at least one link joining adjacent pairs of the rods. Each of the U-shaped links has a pair of spaced leg portions extending generally in the lengthwise dimension of the belt and a connecting portion joining the spaced leg portions. Each of the leg portions has holes formed through it for the passage of an adjacent pair of rods. The holes in the leg portions of the inside links and in the outside links have end surfaces with predetermined longitudinal spacing between the end surfaces. The holes in the inside links have a first longitudinal end surface spacing, while the holes in the outside links have a second, greater longitudinal end surface spacing. The first longitudinal spacing is correlated to the second longitudinal spacing and to the predetermined radius of curvature so that in straight line conveying motion the inside ends of the rods are kept at the first pitch and the inside U-shaped links are tractive while the outside links are non-tractive, and during lateral curved conveying motion the inside ends of the rods are kept at substantially the first pitch and at least one of the inside U-shaped links remains tractive while the outside ends of the rods move to the second greater pitch.

The correlation of the longitudinal spacing of the end surfaces is preferably set so that the outside ends of the rods contact the opposing end surfaces of the holes in the outside links when the belt travels around a lateral curve of the predetermined maximum curvature with the outside links assuming only a minimal amount of tractive load. Such a correlation assures that at least one of the inside links remains tractive and that the inside ends of the rods remain at substantially the first pitch. The use of this correlated spacing is particularly advantageous in a helical tiered conveying system wherein the curvature in the helix is the maximum curvature of the system. The belt can then be readily adapted to the system so that a non-collapsing inside edge is assured throughout the tiers of the system, while the outside edge of the belt moving through the tiers is stabilized by the contact of the rods with the end surface of the holes in the outside links.

Another embodiment of the link mechanism also holds the first and second transverse ends of the rods at substantially the same first pitch during straight line motion of the belt, and during motion of the belt about a lateral curve, this link mechanism holds the rods to the first pitch along the transverse ends of the rods located at the inside concave edge of the lateral curve. However, this link mechanism moves the opposite transverse ends of the rods to a second greater pitch along the outside convex edge of the lateral curve as the belt proceeds from straight line to lateral curved motion, and returns the opposite transverse ends of the rods to the first pitch as the belt moves from lateral curved to straight line motion.

The conveyor belt using the second embodiment of the link mechanism can be adapted to travel around lateral curves in a single direction or around lateral curves in both the right and left directions. When the belt is designed to travel around lateral curves in a single direction, the link mechanism includes both single pitch links and dual pitch links. However, when the belt is designed to travel around lateral curves in both the left and right directions, dual pitch links are disposed along both edges of the belt. The dual pitch links are pivotable between a first position and a second position. In the first position the transverse ends of the rods connected by the respective links are held at the first pitch; and, during the pivoting motion of the links from the first to the second position, are moved from the first pitch to the second pitch.

Each of the dual pitch links includes a body which has a pivot aperture and a pitch changing slot. The transverse end of one of the rods is received in the pivot aperture and the transverse end of an adjacent one of the rods is slidably received in the pitch changing slot. A cam mechanism is provided for pivoting the dual pitch links between their first and second positions during motion around lateral curves.

A conveyor belt formed of the transverse rods and dual pitch links, or links which allow the outside edge of the belt to expand while keeping the inside edge of the belt at a constant pitch, allows the belt to operate in a straight line direction and around curves without the problems resulting from a conveyor belt that has a collapsing inner edge as it proceeds around lateral curves.

Another preferred aspect of the present invention is directed to the use of at least one support link joining pairs of the adjacent rods. The support links include a longitudinal portion extending both longitudinally between a pair of the adjacent rods and vertically away from the rods, and at least one tab portion extending transversely from the longitudinal portion. Holes are formed in each longitudinal portion to couple the support links to adjacent pairs of rods. The tab portions are spaced a predetermined vertical distance from the rods to contact an inside edge of an adjacent vertically spaced tier of the belt and thereby support the inside edge of the superimposed tiers when the belt is arranged to travel along a helical conveying path.

The present invention is also directed to a conveying system which uses belts of the type described and which moves the belt through a helical conveying path that forms a plurality of stacked tiers of the belt. Belts which have a constant non-collapsing inside pitch are particularly useful in such stacked tier systems since a significantly less amount of belt is required for a given helical path over the amount of belt which is needed using prior art belts with a collapsing inside edge. Less amount of the belt is necessary to accommodate the same amount of an offloading surface. The use of a non-collapsing pitch in combination with a drive drum and support links along the inside edge of the belt is particularly advantageous, because localized shifting of the inside edge of the belt as it moves through the helical path is greatly minimized.

A further preferred aspect of the present invention is directed to the construction of the U-shaped links in a manner to substantially increase their wear characteristics. According to this aspect of the invention, tractive link members for connecting adjacent rods of an endless conveyor belt are comprised of a substantially flat piece of metal which is formed into a general U-shaped with a pair of spaced leg portions joined by a connecting portion. The substantially flat piece of metal has a reduced thickness area in the connecting portion formed of a compressed, work-hardened area of the metal. The work-hardened area of the connecting portion forms a curved bearing surface against which a rod can bear.

In the system of the present invention the ware can be loaded as closely as possible, so that for a given were capacity, the belt can be driven at a lower speed, thereby increasing the life of the belt. Also, the rod-link arrangement allows the belt to be used in normal charge and discharge operations, and about end pulleys, rolls and take-up mechanisms. Also, for a given inside radius of a lateral curve about which the belt travels, the tension on a belt of the present invention in a spiral or curved tier system would be less than with conventional rod-link belts.

The use of support links in accordance with the present invention, whereby the support links are used in combination with constant pitch U-shaped inside links, also results in significant advantages. The support links allow for a significant reduction in height of the external belt support, while maintaining compatibility with sprockets and allowing the belt to proceed about comparatively tight bends around rolls, pulleys, etc. Furthermore, these advantages are attained without the disadvantages of the collapsing inner belt edge mentioned above, such as lower efficiency, wrinkling of ware or freezing together of adjacent ware. A smoother transition from straight line conveying into helical, stacked tier conveying also results from preventing the collapse of the inner edge of the belt by the constant pitch U-shaped inside links.

Finally, the use of tractive links having work-hardened bearing surfaces greatly enhances the wear characteristics of the tractive links. The work-hardened, curved inner bearing surface of the connecting portion of the links reduces wear elongation of the links in two ways. First, by increasing the area of contact, the same volume of wear would represent a smaller elongation of the link pitch. Secondly, by forming the curved surface through a coining process which reduces the thickness of the connecting portion from a relatively large thickness to a smaller thickness, the connecting portion becomes a work-hardened, wear resistant section of material. Prevention of wear elongation of tractive links is particularly important for the belt of the present invention wherein the belt and conveyor system are designed so that the inside links remain tractive in both straight line and lateral curved motion, and, as the belt is frequently used in environments where sanitation is important, undesirable wear debris can be diminished.

Further objects, features and other aspects of this invention will be understood from the following detailed description of the preferred embodiment of this invention referring to the annexed drawings.

DETAILED DESCRIPTION OF THE INVENTION

Figure 1:
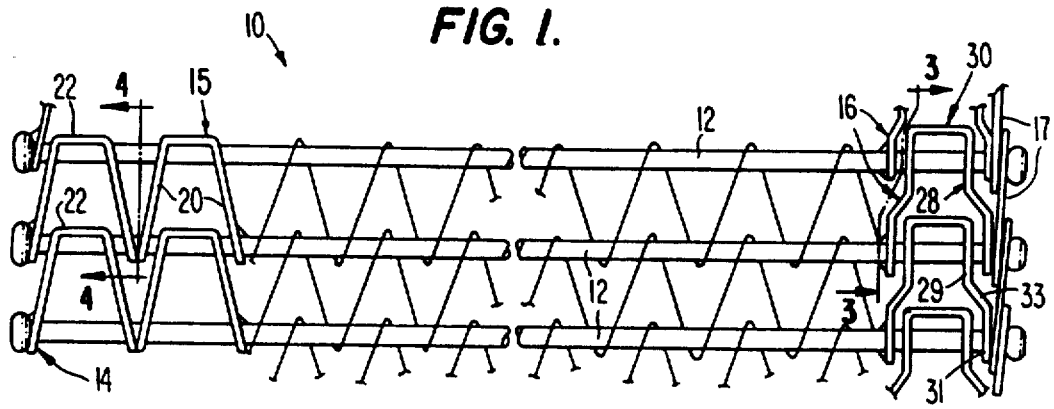
FIG. 1 is a plan view of a portion of a conveyor belt in accordance with the present invention, illustrating the belt traveling in as straight line direction.
Figure 2:
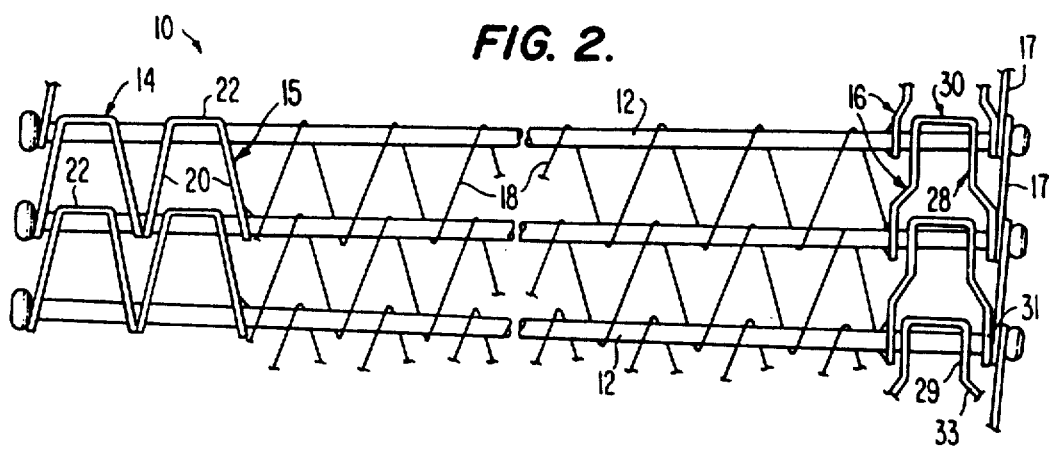
FIG. 2 is a plan view of the conveyor belt of FIG. 1, illustrating the belt passing around a lateral curve.

Referring to the Figures wherein like numerals indicate like elements, a portion of a conveyor belt 10 is shown in FIGS. 1 and 2. FIG. 1 illustrates the orientation of belt 10 as it moves in a straight line conveying motion, and FIG. 2 illustrates the orientation of belt 10 as it moves in a lateral curved direction to the left. The left edge of belt 10 therefore can be described as the inside concave edge of belt 10, while the right edge can be described as the outside convex edge of belt 10. Conveyor belt 10 is formed of a plurality of rods 12, which extend transversely of the length of belt 10 between inside and outside ends, inside links 14 and 15 along the inside edge of belt 10 and outside links 16 and 17 along the opposite, outside edge of belt 10. Links 14, 16 and 17 couple adjacent rods 12 to one another to form a length of belt 10. A woven mesh material 18 may be disposed around rods 12 and between links 14 and 16. The ends of rods 12 have enlarged or upset ends. Insidemost links 14 are held in position by welding to the inside enlarged ends of rod 12. The outermost inside links or connectors and outside links 16 are likewise held in transverse position by being welded to rods 12.

Links 14 and 15 are generally U-shaped links having leg portions 20 which extend generally in the lengthwise direction of belt 10, and connecting portions 22, which joint leg portions 20. Leg portions 20 have a pair of spaced holes 24, 25 for receiving the inside ends of a pair of rods 12. Holes 24, at the trailing end of link 14 and 15, are slightly oversized with respect to the cross-sectional dimension of rod 12 to permit cleaning of the belt. Holes 25, at the leading end of links 14 and 15, are in the form of a slot of oversized width, likewise for the purpose of permitting cleaning. Holes 24 and 25 are located and shaped so that the inside ends of rods 12 are kept at a first pitch (center to center spacing between adjacent rods 12) when the belt is under tractive load. Also, links 14 and 15 and rods 12 along the inside concave edge of belt 10 remain under tractive load during both straight line motion and lateral curved motion. As will be explained, the inside portions of rods 12 are kept at the first pitch and under tractive load in both straight line motion and lateral curved motion of belt 10 by the specific design of the combination of links 14, 15, 16 and 17, which form a link mechanism for belt 10.

Figure 5:
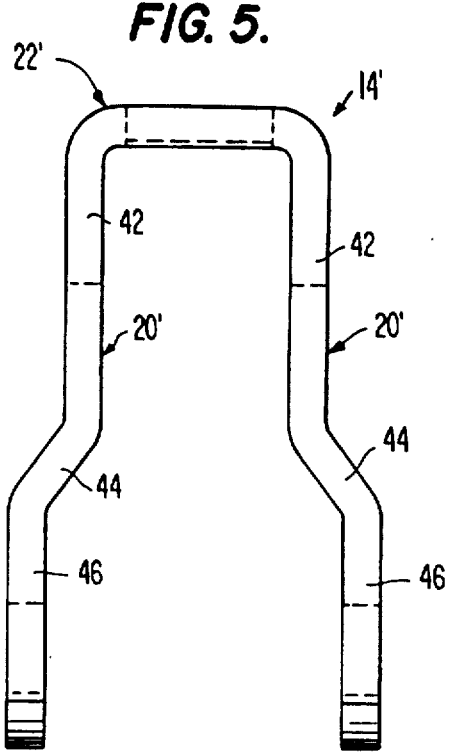
FIG. 5 is a plan view of an improved U-shaped link having a work-hardened, curved bearing surface and modified leg portions.
Figure 6:
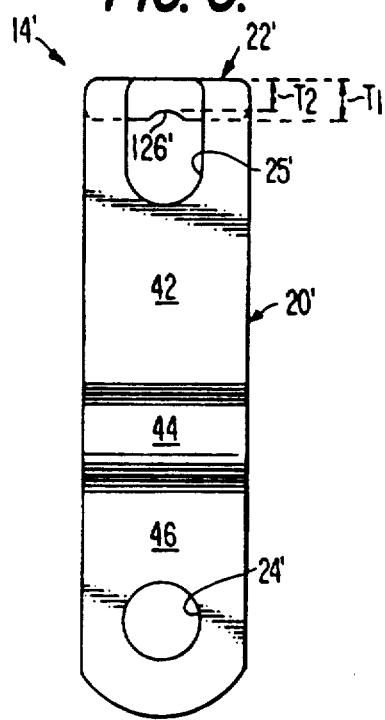
FIG. 6 is a side view of the link illustrated in FIG. 5.

Inside links 14 and 15 have leg portions 20 which are substantially straight and which diverge outwardly from opposite ends of connecting portion 22. Alternatively, the inside links can be configured as links 14', which are also generally U-shaped and are illustrated in FIGS. 5 and 6. Link 14' has a connecting portion 22' similar to connecting portion 22, however, leg portions 20' are formed different from leg portions 20. Each leg portion 20' includes an inner section 42 extending generally perpendicularly from connecting portion 22', a middle section 44 diverging outwardly from inner section 42, and an outer section 46 extending from middle section 44 in a direction generally parallel to inner section 42.

Figure 3:
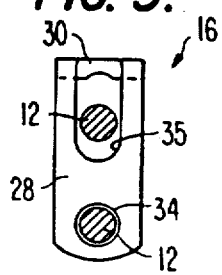
FIG. 3 is a sectional view taken generally along lines 3—3 of FIG. 1.
Figure 4:
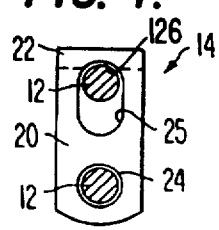
FIG. 4 is a sectional view taken generally along line 4—4 of FIG. 1.

Outside links 16 likewise each have a pair of spaced apart leg portions 28 joined by a connecting portion 30. Leg portions 28, like leg portions 20', include inner and outer sections 29 and 31, orientated perpendicular to connecting portion 30, which are joined by a middle outwardly diverging section 33 so that leg operations 28 take on a stepped configuration, gradually increasing in width away from connecting portion 30. Such a configuration is similar to prior art nestable U-shaped links. As seen in FIG. 3, each leg portion 28 has a pair of holes 34, 35 for receiving adjacent rods 12. Hole 35, which is adjacent connecting portion 30 is in the form of an elongate slot, which allows rods 12 to move from the collapsed position shown in FIG. 1 during straight line conveying motion, to the expanded position shown in FIG. 2, during conveying about lateral curves.

In addition to U-shaped links 16, bar links 17 can be disposed in a single row along the outer transverse edge of belt 10 between outside links 16 and the enlarged heads at the outer ends of rods 12. Similar to links 16, links 17 have a pair of holes, at least one of which is slotted to permit the expansion of the pitch of the outer edge of belt 12.

Each link 14, 14' is formed of a substantially flat piece of metal. The flat piece of metal has a first thickness $T_1$ along the top and bottom areas of connecting portions 22, 22' and along leg portions 20, 20'. A curved bearing surface 126, 126' is formed in the inner surface of connecting portions 22, 22', while the outer surface remains substantially flat. Bearing surface 126, 126' is formed by a coining process wherein the material of connecting portions 22, 22' is compressed to a maximum reduced thickness $T_2$. The compressed, reduced thickness area thus becomes a work-hardened area of connecting portions 22, 22'. The maximum reduced thickness $T_2$ is at least 90% of thickness $T_1$ and not less than preferably 70%, with a typical example being $T_1$ of 0.105 inch reduced to $T_2$ of 0.80 inch. The curved bearing surface substantially mates with the outer surface of rod 12, i.e. has substantially the same radius of curvature. Links 16 can also include a work-hardened bearing surface. However, this is not necessary since links 16 are designed not to take on any significant tractive load.

Conveyor belt 10 and links 14, 15, 16 and 17 are designed to be used in a conveying system wherein belt 10 will travel about lateral curves in a single direction and the lateral curves have a predetermined maximum curvature, i.e., the radius of curvature of the tightest lateral curve in the system will not be below a predetermined value. Links 14, 15, 16 and 17 will have predetermined spacing between the forwardmost and rearwardmost surfaces of the holes in the links which is correlated to the predetermined maximum curvature of the belt travel and to one another. This correlation of spacing is set to assure that the portions of rods 12 along the inside edge of the belt remain at substantially the first pitch, and that at least one of the inside links 14, 14' continues to bear a tractive load while the belt proceeds around lateral curves up to the predetermined maximum curvature.

Conveyor belt 10 is driven along its inside edge in a conventional manner by a drive sprocket or drive cage engaging the inside edge of the belt. As the belt travels in a straight line direction, the tractive load is shared by all the inside links, and the inside ends of the rods are kept at the first pitch. The use of at least two inside U-shaped links assures that rods 12 extend substantially parallel during straight line motion under tractive load. If only one U-shaped link were used along the inside edge, the rods might extend in a non-parallel manner due to inaccuracies in the formation of the U-shape. It is therefore important that a plurality of inside links be used to assure the parallel alignment of the rods.

As belt 10 travels about a lateral curve, the outside ends of rods 12 expand in the slots of the outside links 16, 17 and the tractive load gradually shifts to the inside links farthest from the inside edge of the belt. Links 14 and 15 have a first predetermined spacing between the forwardmost and rearwardmost surfaces of their holes, and outside links 16 and 17 have a second, greater spacing between the forwardmost and rearwardmost surfaces of their holes. The first and second predetermined spacings are correlated to one another and to the predetermined maximum curvature of the belt so that outside links 16 and 17 assume only a minimal amount of the tractive load during travel about a lateral curve of the predetermined maximum curvature. Preferably, this predetermined spacing results in rods 12 contacting the bearing surfaces of the holes in outside links 16 and/or 17 without assuming any measurable tractive load so that inside links 14 and 15 continue to assume substantially all the tractive load. This condition is particularly desirable because links 16 and 17 will allow only a negligible amount of play between links 16, 17 and the bearing surfaces of rods 12, thereby assuring smoothness of operation, while also insuring that the inside links remain tractive and the inside edge of the belt does not collapses. This is accomplished by setting the ratio of the spacing ($P_0'$) of the holes in the outside links 16, 17 to the distance ($R_0$) from the center of the radius of curvature of the belt to the outermost outside links in the tightest curve only slightly greater than the ratio of the spacing ($P_i$) of the holes 24, 25 in the inside links 14 and 15 to the distance ($R_i$) from the center of the radius of curvature of the belt to the outermost leg 20 of inside links 14 and 15. Using the equation:

$$\frac{R_o}{R_i} \times P_i = P_o.$$

then $P_0' - P_0 = 0.005$ to 0.010 inches. For example, in a system with a four and a half (4½) foot radius drive cage, two one-inch inside links, and a three (3) foot wide belt; $R_i = 56$ inches; $R_O = 90$ inches; $P_i = 1.080$ inches; and $P_0 = 1.735$ 1 inches; then $P_0' = 1.740$ to 1.745 inches. In such a belt, where the tractive load in the helical path could typically be 200 pounds, the inside links would continue to assume 150 to 200 pounds of the tractive load in lateral curves of the predetermined maximum curvature.

In addition, U-shaped outside links 16 serve an important function in preventing the outer edge of belt 10 from lagging an unacceptable amount behind the perfect radial extension of rod 12 from inner links 14 and 15. Such lagging is a result of a drag force created by the weight of belt 10 and its associated product load on a support surface as the belt moves about a lateral curve. In order for the rods to lag, links 16 would have to rotate with respect to a perfect radial line of the rods in a curved path; however, such rotation is held to a minimum by the nesting action of consecutive U-shaped outside links 16, thereby restricting the amount of lag that can occur. For manufacturing ease, when U-shaped links 16 are used in combination with bar links 17, bar links 17 can be designed to have the correlated spacing $P_o'$ and links 16 can have an even greater longitudinal spacing between the end surfaces of their holes, thereby functioning principally to prevent lag.

Figure 7:
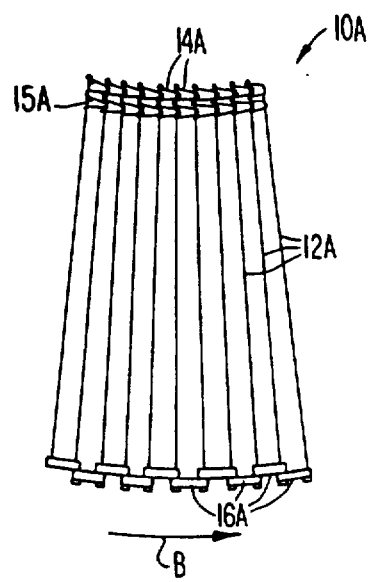
FIG. 7 is a schematic plan view of a portion of a conveyor belt in accordance with the present invention, using a second embodiment of a link mechanism and illustrating the belt passing around a lateral curve.
Figure 8:
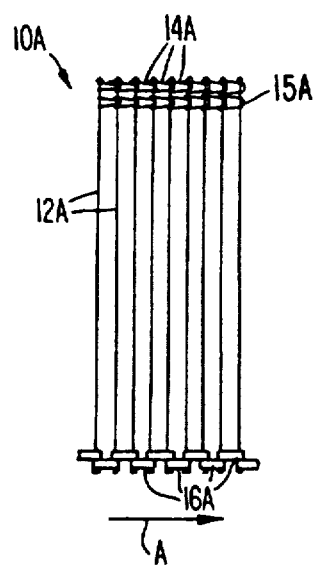
FIG. 8 is a schematic plan view of the conveyor belt of FIG. 7, illustrating the belt traveling in a straight line direction.

Referring to the FIGS. 7-15, a second embodiment of a conveyor belt, designated generally 10a is illustrated. A portion of a conveyor belt 10a is shown in FIGS. 7 and 8. Conveyor belt 10a is formed of a plurality of rods 12a, single pitch links 14a and 15a along one edge of belt 10 and dual pitch links 16a along the opposite edge of belt 10. Rods 12a extend transversely of the length of the belt 10a and they have enlarged or upset sends. Links 14a, 15a and 16a couple adjacent rods 12a to one another to form a length of belt 10a.

Single pitch links 14a and 15a can be conventional U-shaped links having apertures for receiving the inside ends of a pair of rods 12. The apertures in links 14a and 15a are slightly oversized with respect to the cross-sectional dimension of rods 12a to permit cleaning, nevertheless, links 14a and 15a hold the ends of rods 12a to substantially a constant or single pitch. Alternatively links 14a and 15a can be formed with work-hardened bearing surface as in links 14 and 14' or can take on the configuration of links 14'.

Links 16a are dual pitch links designed to change the pitch of rods 12a (spacing between adjcent rods 12a) along the edge at which they are disposed betewen a first pitch and a second greater pitch. The first pitch is substantially equal to the pitch at which links 14a and 15a hold the inside ends of rods 12a during straight line motion as shown in FIG. 8. When belt 10a proceeds around a lateral curve, as shown in FIG. 7, dual pitch links 16a move the outside ends of the rods to which they are coupled to the second greater pitch along the outside convex edge of the lateral curve, while links 14a and 15a hold the inside ends of the rods to which they are attached to the first pitch along the inside concave edge of the lateral curve. As with rods 12, the inside portions of rods 12a are kept at substantially the first pitch and under tractive load in both straight line motion and lateral curved motion of belt 10a by the specific design of the combination of single pitch links 14a and 15a and dual pitch links 16a, which form a link mechanism for belt 10a.

Figure 9:
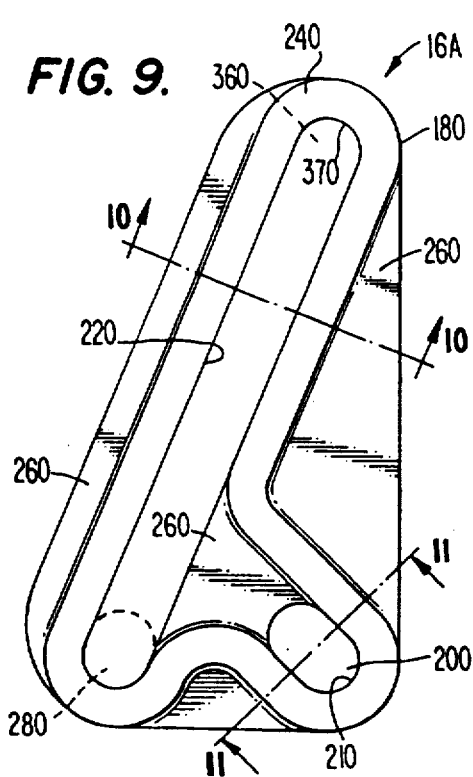
FIG. 9 is side view of a dual pitch link in accordance with the present invention.
Figure 10:
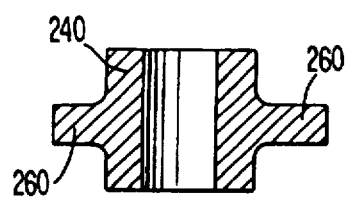
FIG. 10 is a sectional view taken generally along the line 10—10 of FIG. 9.
Figure 11:
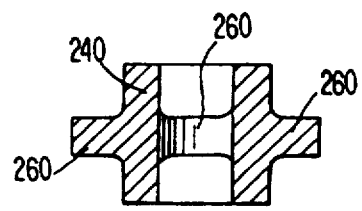
FIG. 11 is a sectional view taken generally along the line 11—11 of FIG. 9.

FIG. 9 illustrates the structural details of one embodiment of a dual pitch link 16a. Link 16a is preferably formed as a single integral body 180 which has a generally triangular shape or perimeter. A pivot aperture 200 and an elongate pitch changing slot 220 are formed through body 180 of dual pitch link 16a. As further illustrated in FIGS. 10 and 11, body 180 can be formed of two thicknesses of material, i.e., a thick portion 240 extending around a substantial portion of aperture 200 and slot 220, and a thinner web portion 260 filling in and extending around the border of thicker portion 240. A two thickness configuration of body 180 is particularly suitable for a body 180 formed of a molded plastic material wherein a sturdy border is provided for aperture 200 and slot 220, while the thinner web portions 260 form an easy to handle, structurally sound and material saving configuration for the integral body 180.

Figure 12:
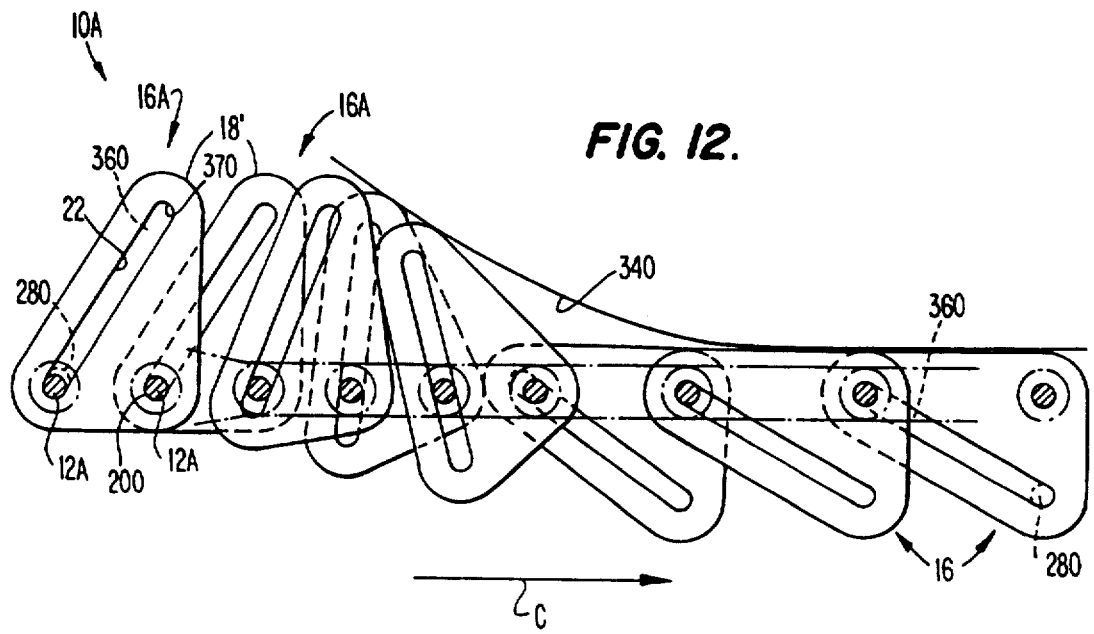
FIG. 12 is a schematic side view, illustrating another embodiment of dual pitch links pivoting from a first pitch to a second greater pitch.
Figure 13:
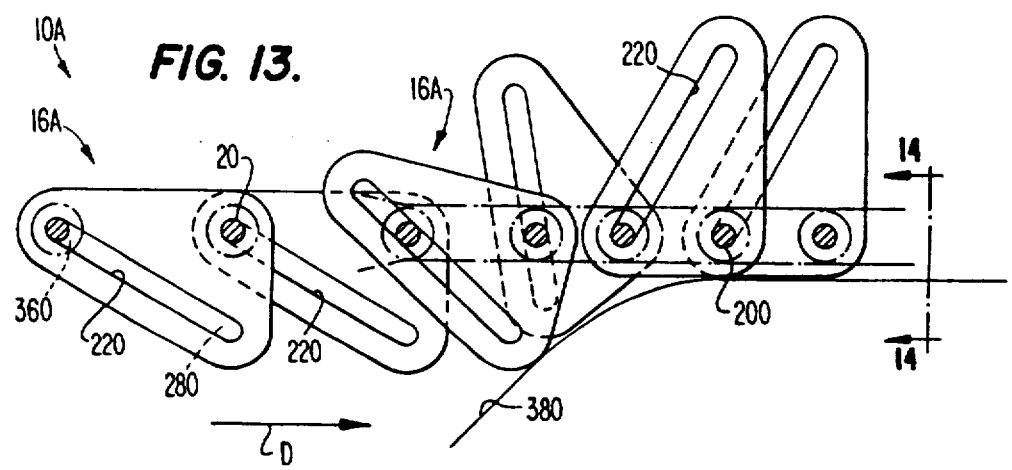
FIG. 13 is a schematic side view similar to FIG. 12, illustrating the dual pitch links pivoting from the second greater pitch to the first shorter pitch.

FIGS. 12 and 13 illustrate an alternate, simplified configuration for the body of dual pitch links 16a, identified as body 180'. As seen therein, body 180' is formed of a flat piece of material containing aperture 200 and slot 220. The shape of body 180' is particularly suitable for links 16a mode from machined metal.

Referring to FIGS. 7, 8, 12 and 13, operation of belt 10a will be explained. FIG. 8 illustrates belt 10a proceeding in a straight line direction indicated by arrow A. As seen therein, the pitch is the same at both edges of belt 10a. Links 14a and 15a are single pitch links which hold adjacent rods at this constant pitch. The position of adjacent rods in straight line conveying is illustrated in FIG. 12 by the left-most pair of rods 12a, and the three right-most rods in FIG. 13. Referring to FIG. 12, a first rod 12a is received in pivot aperture 200 of the left-most dual pitch link 16a and an adjacent rod 12a is received in pitch changing slot 220 of this link 16a. The last-mentioned rod 12a is located in a first pitch area 280 of slot 220 which is located adjacent rods 12a at substantially the same pitch as links 14a and 15a locate the adjacent rods. This pitch is the shortest pitch allowed by link 16a. In this condition, tractive load can be shared between the U-shaped single pitch links 14a and 15a and the dual pitch links 16a. Links 14a, 15a and 16a can be dimensioned, however, so that the relative amounts of tractive load can be shared unevenly. For example, when dual pitch links 16a are formed of a plastic material, it is desirable to have single pitch links 14a and 15a, which are generally formed of metal, carry more of the tractive load.

The orientation of rods 12a, when belt 10a proceeds around a lateral curve, as shown by arrow B, is illustrated in FIG. 7. As seen therein, the inside concave edge of belt 10a remains at the same first pitch as in straight line motion, while the outside convex edge of belt 10a has been moved to a greater pitch by dual pitch links 16a. FIG. 12 illustrates the pivoting motion of links 16a that moves the outside ends of rods 12a along the outside edge to the second greater pitch. As seen therein, a cam surface or the like 340 for pivoting the dual pitch links is located adjacent outside edge of belt 10a in alignment with links 16a. As belt 10a proceeds in the direction of arrow C, an upper edge of links 16a contacts cam surface 340 which causes links 16a to pivot in a counterclockwise direction. The pivoting motion of links 16a causes the ends of rods 12a received in the pitch changing slot 220 to slide from the first pitch area 280, wherein adjacent rods 12a are close to one another, to a second pitch area 360 where the spacing between adjacent rods 12a is greater. The pitch changing slot second pitch area forwardmost end surface is 370. See also, FIG. 9. As seen in FIG. 12, cam surface 340 can cause link 16a to pivot 90° and locate rod 12a carried in slot 220 at the furthest end of slot 220 to contact the second pitch area 360 end surface 370. The length and orientation of pitch changing slot 220 is selected to accommodate the greatest pitch along outside curve edge for a given system. Of course, if smaller pitches are required within the same system, cam surface 340 can be designed to pivot dual pitch links 16a to a lesser degree, thereby locating the end of rod 12a received in slot 220 within an intermediate position in second pitch area 360.

FIG. 13 illustrates the manner in which links 16a are pivoted to return rods 12a from the second pitch used in lateral curved motion to the first pitch used in straight line conveying. As shown therein, belt 10a proceeds in the direction of arrow D and links 16a contact a cam surface or the like 380, which pivots links 16a in a clockwise direction. The clockwise pivoting motion of links 16a moves the ends of transverse rods 12a from the second pitch area 360 to the first pitch area 280 of pitch changing slots 220.

Figure 14:
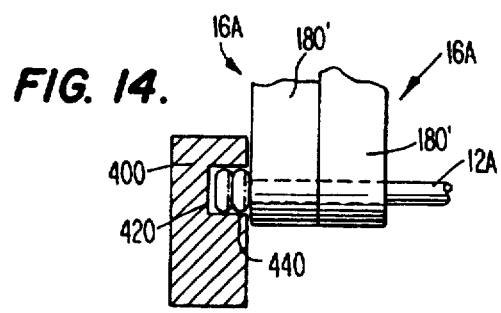
FIG. 14 is an end view, partially in section, illustrating a guide track for receiving a rod end.

As seen in FIG. 14, an elongate guide block 400, having a guide slot 420, can be located adjacent the belt outer edge in the transition area where cam surfaces 340 and 380 cause pivoting motion of links 16a. The outermost end of rods 12a are carried within guide slot 420 to keep the ends of rods 12a within the plane of conveying motion of belt 10a during pivoting of links 16a. As further seen in FIG. 14, the ends of rods 12a received within slot 420 preferably have a double struck upset head, which assures that the end of transverse rod 12a remains within guide slot 420 even after wear occurs. Guide slot 420 can be eliminated at curves where smooth travel of the belt is not required, for example, on return portions of the conveyor where no ware is being transported, or on a loaded portion of the conveyor if a slight momentary humping of the conveyor surface will not disarrange the ware.

Similar to conveyor belt 10 and links 14, 15, 16 and 17, conveyor belt 10a and links 14a, 15a and 16a can be used in a conveyor system embodiment wherein belt 10a will travel about lateral curves in a single direction and the lateral curves have a predetermined maximum curvature, i.e., the radius of curvature of the tightest lateral curve in the system will not be below a predetermined value. Single pitch links 14a, and 15a and dual pitch links 16a will have predetermined spacing between the forwardmost and rearwardmost surfaces of the holes or slots in the links which are correlated to the predetermined maximum curvature of the belt travel and to one another. This correlation of spacing is set to assure that the portions of rods 12a along the inside edge of the belt remain at substantially the first pitch, and that at least one of the inside single pitch links continues to bear a tractive load while the belt proceeds around lateral curves up to the predetermined maximum curvature. This correlation of spacing is set in the same manner as discussed above with respect to belt 10.

Conveyor belt 10a, also similar to conveyor belt 10, is driven along its inside edge in a conventional manner by a drive sprocket or drive cage engaging the inside edge of the belt. As the belt travels in a straight line direction, the tractive load is normally shared by all the single pitch links 14a, and 15a and the inside ends of the rods are kept at the first pitch. The use of at least two inside U-shaped links helps assure that rods 12a extend substantially parallel during straight line motion under tractive load.

As belt 10a travels about a lateral curve, the outside ends of rods 12a expand in the pitch changing slots 220 of the dual pitch links 16a. The rod actually expands from the slot first pitch area 280 to the second pitch area 360. Also, the tractive load gradually shifts to one of the two single pitch links which is farthest from the inside edge of the belt.

Figure 15:
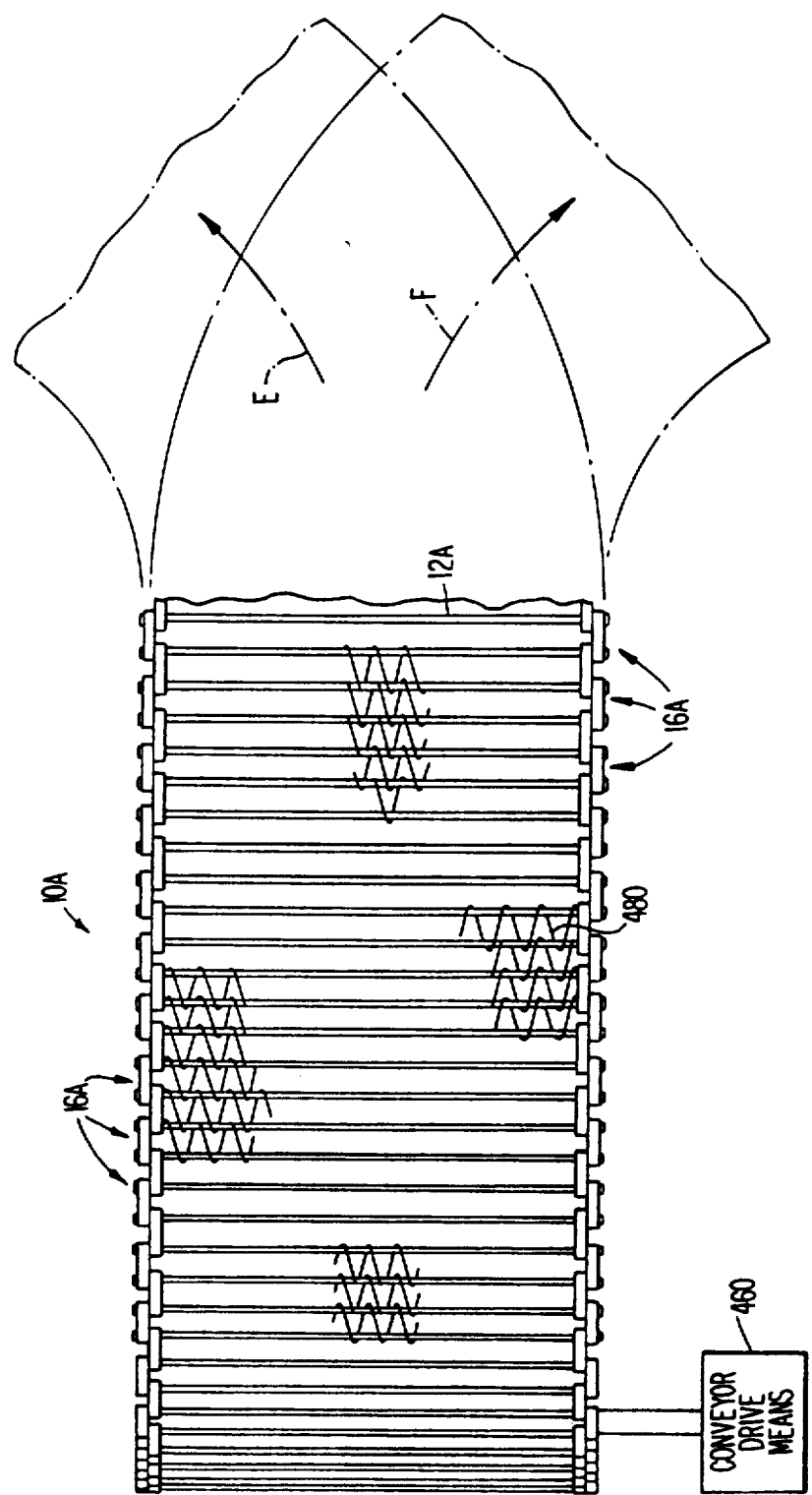
FIG. 15 is a schematic top plan view illustrating a conveyor belt designed to travel in both lateral directions with dual pitch links on both transverse edges of the belt.

FIG. 15 illustrates an embodiment of belt 10a wherein a conveyor system uses dual pitch links 16a disposed along both sides of the belt in order to allow the belt to travel in both the left and right directions as shown by arrows E and F. In such motion, the dual pitch links on the inside edge of the curve would remain at the first pitch position, while dual pitch links 16a along the outside edge of the curve would be pivoted to the second, greater pitch orientation. FIG. 15 also illustrates belt 10a as part of a conveying system with a conventional conveyor drive mechanism 460, such as a sprocket drive, for moving the conveyor belt 12a.

A mesh overlay 480 placed around rods 12a is also illustrated in FIG. 15. Mesh overlay 480 can be of any conventional design, such as wire formed into flattened helicals. The overlay is used to provide support for relatively easily damaged ware. The overlay can be manufactured to a width somewhat wider than its final assembled form on belt 10a so that it provides pressure in the transverse direction against both the inner and outer links to assure that they maintain their transverse position on rods 12a, thereby eliminating the need for further welding or the use of mechanical devices to hold the links in place.

Figure 16:
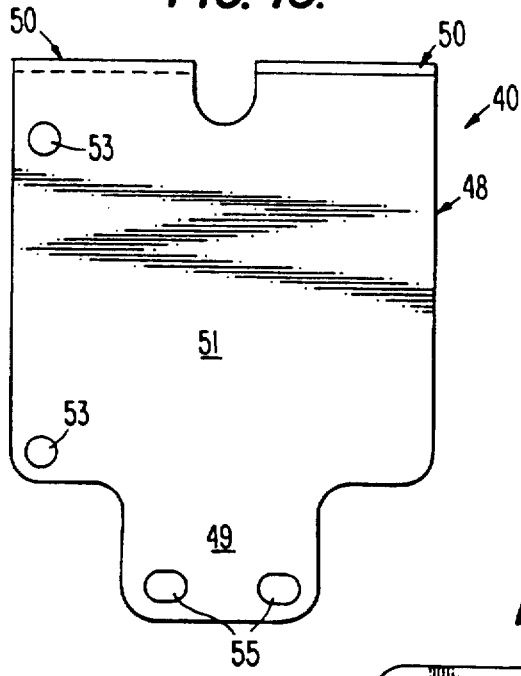
FIG. 16 is a side view of a support link in accordance with the present invention.
Figure 17:
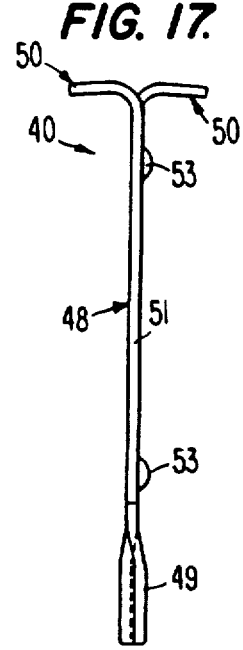
FIG. 17 is a front edge view of the support link illustrated in FIG. 16.
Figure 18:
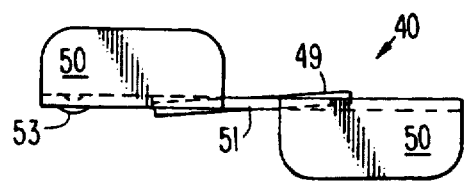
FIG. 18 is a top plan view of the support link illustrated in FIG. 16.
Figure 19:
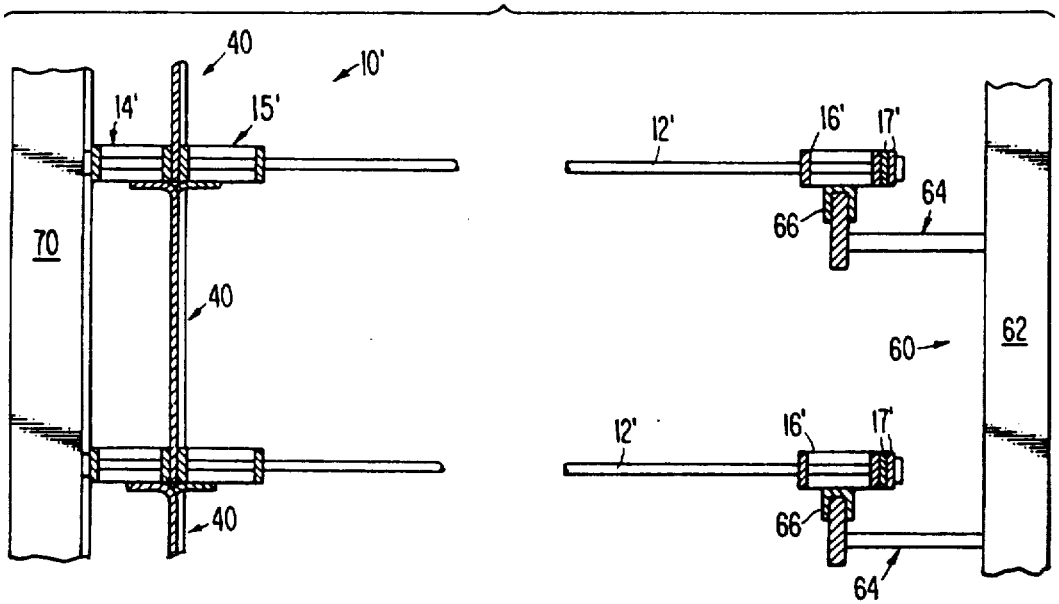
FIG. 19 is a schematic vertical sectional view illustrating a pair of stacked tiers of a conveyor belt with the support links disposed along the inside edge of the belt.
Figure 20:
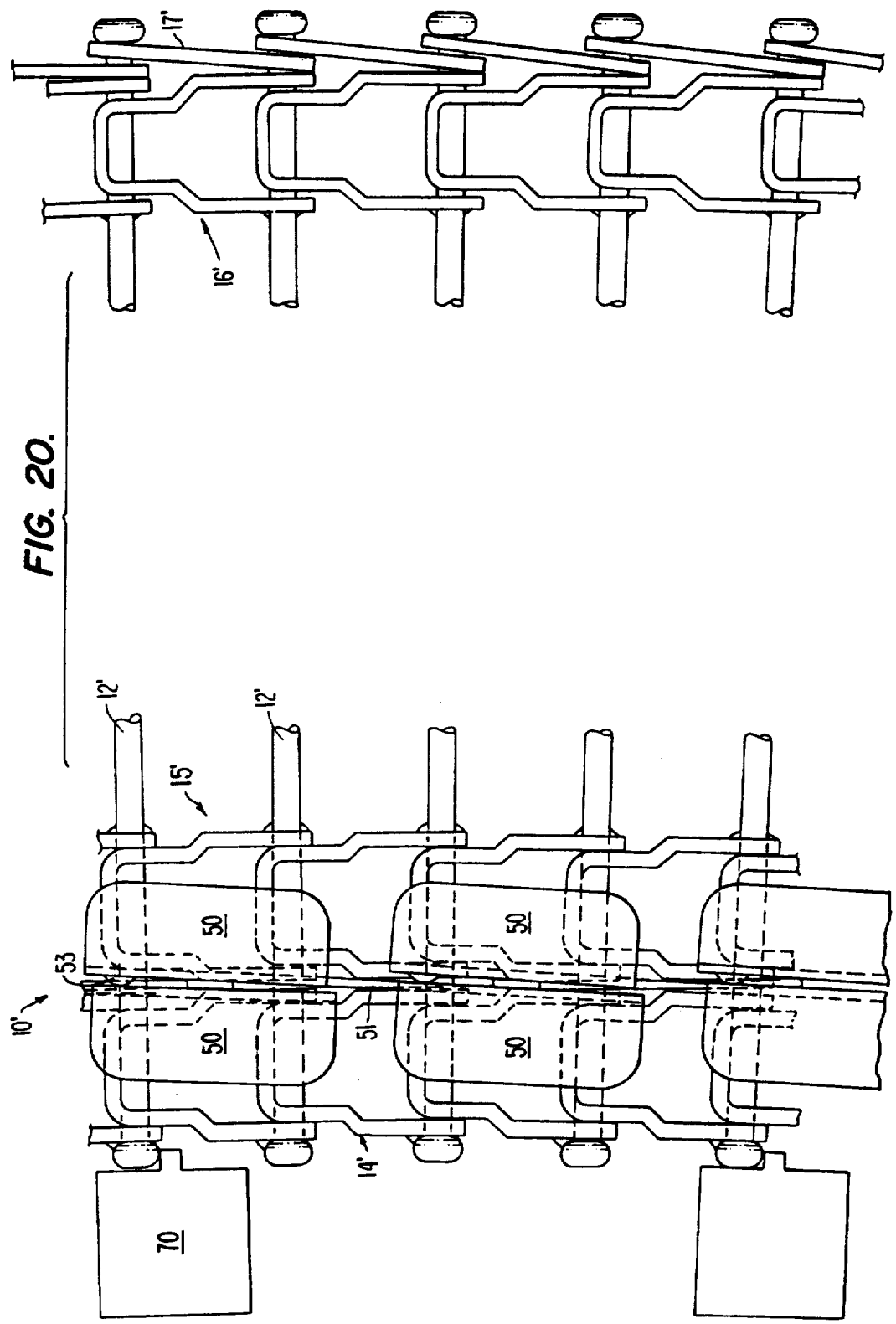
FIG. 20 is a top plan view of a portion of the conveyor belt illustrated in FIG. 19.
Figure 21:
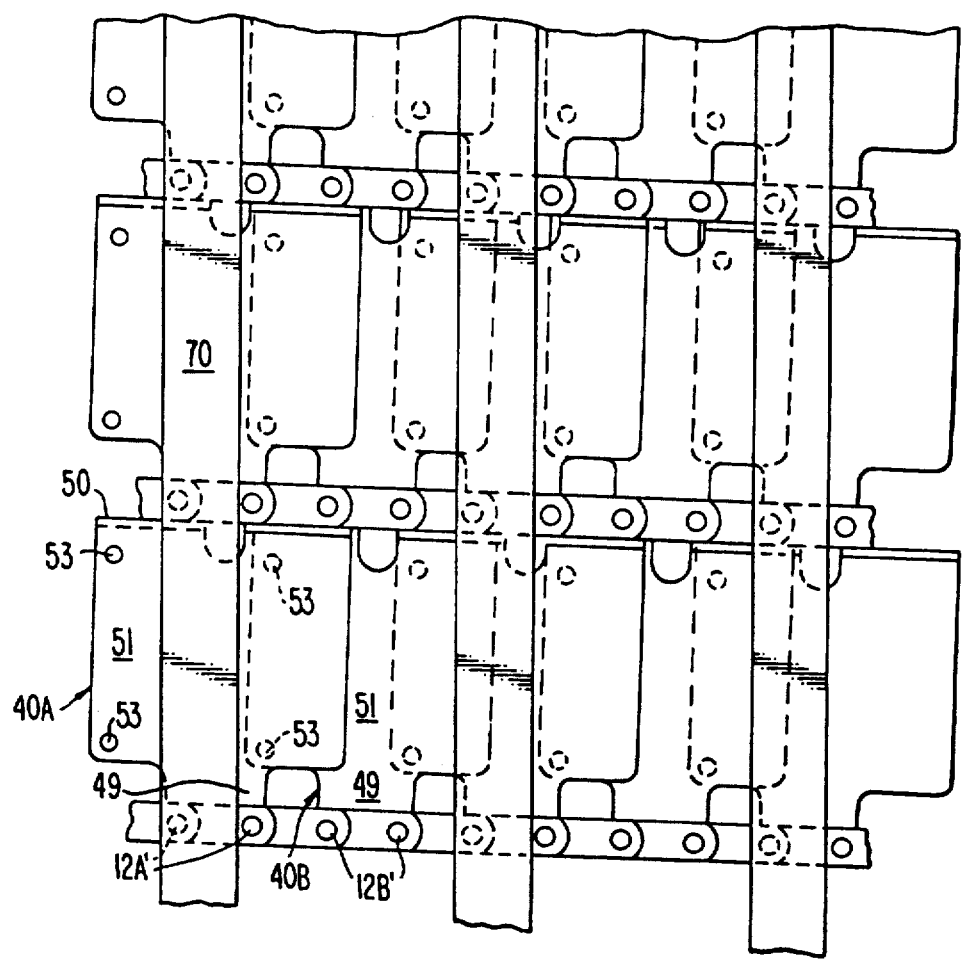
FIG. 21 is a side view along the inside transverse edge of the conveyor belt illustrated in FIG. 19.

FIGS. 19, 20, and 21 illustrate an embodiment of the invention wherein a conveyor belt 10' is used in a conveying system in which belt 10' travels along a helical path comprised of a number of superimposed helically extending tiers. The conveyor belt of this embodiment will be designated 10', with elements of belt 10' which are similar to belt 10 indicated by like primed numerals. FIGS. 16, 17 and 18 illustrate details of an inside support link 40 used with belt 10'.

Support links 40 include a longitudinal portion 48 and tab portions 50. Longitudinal portion 48 is formed in two sections, i.e., a lower section 49 and an upper section 51. Lower section 49 contains a pair of holes 55 for receiving ends of adjacent rods 12', and tab portions 50 extend in opposite transverse direction from an upper end of upper section 51. Upper section 51 extends both upward and longitudinally in two directions from lower section 49. As best seen in FIG. 21, a first support link 40A is coupled to a first pair of adjacent rods 12A', while the next support link 40B is coupled to the next separate pair of adjacent rods 12B'. Lower section 49 is held in alignment with the direction of travel of belt 10' by end sections 46 of U-shaped links 14'. Upper section 51 of support links 40 are angularly offset by approximately 4 degrees from the respective lower sections 49 in order to allow the longitudinal ends of adjacent longitudinal portions 51 to overlap. One end of longitudinal portions 51 include dimples 53 which keep the overlapping portions of adjacent support links 40 out of contact to permit cleaning.

Each tab portion 50 has a width which is sufficient to contact and support links 14' and 15' disposed in a tier above it. Also, the length of each tab portion 50 is set so that belt 10' can proceed around reverse bends without adjacent tab portions 50 coming into contact with one another.

As seen in FIG. 19, as the belt proceeds around a helical path, the outer ends of belt 10 are supported by an independent support structure 60. Support structure 60 includes a plurality of vertical members 62 (one of which is illustrated), from which a plurality of horizontal tier supports 64 extend. Each tier support 64 includes a low friction bearing material 66 on which outer links 16' slide. The inside edge of belt 10' is supported on a rotating base (not shown) and successive tiers of the helical path created by belt 10' are supported one upon another by means of support links 40. To accomplish this self-supporting feature, the vertical distance which tab portions 50 are located above rods 12' is selected to accommodate the particular helical path and the ware to be supported on belt 10'. Belt 10' is driven by an internal rotating cage which includes a plurality of vertically extending driving members 70. FIG. 19 illustrates belt 10' with generally U-shaped outside link 16' and bar links 17'. However, belt 10' can also incorporate dual pitch links 16a along the outside edge of belt 10'.

Figure 22:
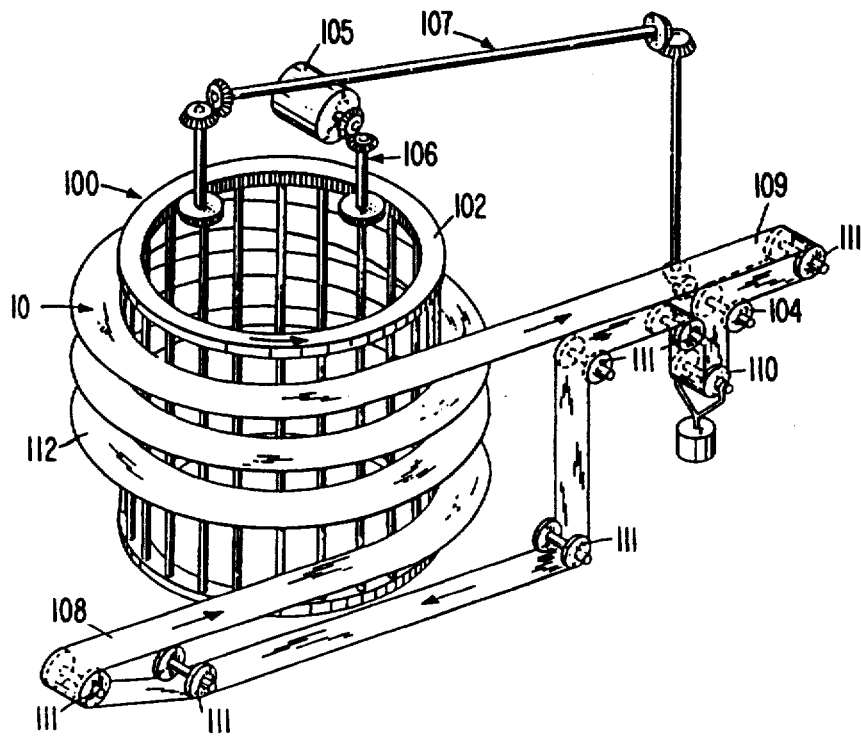
FIG. 22 is a schematic drawing of a conveyor system in accordance with the present invention wherein the belt conveys about a helical path and is driven by a frictional drive mechanism.

Referring now to FIG. 22 a spiral low tension helical tier conveying system 100 of the type shown in U.S. Pat. Nos. 4,078,655 and 3,348,659 is illustrated. System 100 can incorporate either of the belts 10, 10' or 10a of the present invention. Since the low tension system is fully described in these patents, which are herein incorporated by reference, and such helical conveying systems are known in the art only a brief description will be given here. In such a low tension system 100, a cage type driving drum 102 frictionally engages the inner edge of belt 10 (10', 10a) to drive it with relatively low tension through a helical path around the drum. In addition, a positive sprocket drive 104 engages the belt 10 along a straight portion thereof. A motor 105 drives the drum 103 through gearing 106 and also drives the positive sprocket drive 104 through interconnected gearing 107. The belt 10 travels from the sprocket drive 104, past weighted tension take up roller 110 and idler pulleys 111 to a straight loading portion 108, then in helical loops 112 around the drum 102 to a straight discharge portion 109 and around another idler 111 back to the drive sprocket.

Figure 23:
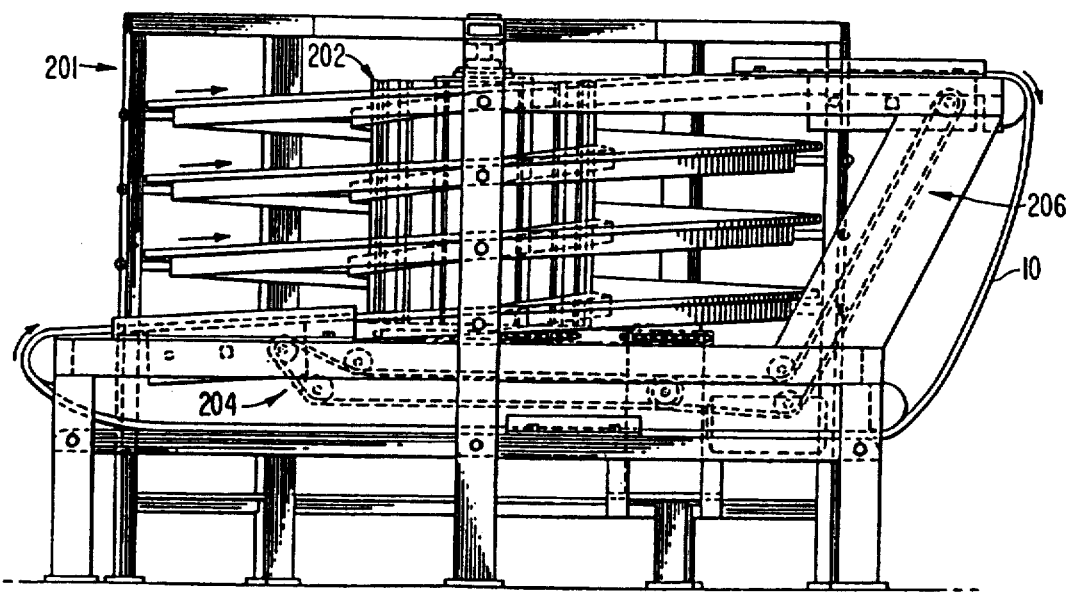
FIG. 23 is a schematic drawing of another embodiment of a conveyor system in accordance with the present invention wherein the conveyor belt conveys about a helical path and is driven by a positive drive mechanism.

Referring now to FIG. 23 a spiral very low tension helical tier conveying systems 200 of the type shown in U.S. Pat. No. 4,741,430, issued on May 3, 1988 to Gerald C. Roinestad is illustrated. System 201 can incorporate either of the belts 10, 10' or 10a of the present invention. Since the very low tension system is fully described in that patent application, which is herein incorporated by reference, and such helical conveying systems are known in the art only a brief description will be given here. In such a system 201, a cage type driving drum 202 positively engages the inner edge of belt 10 (10', 10a ) to drive it with very low tension through a helical path around the drum. Driving drum 202 functions as the primary drive for the belt moving in the helical path; however, secondary drives 204 and 206 are provided adjacent the inlet and outlet of the helical path to maintain a desired fixed length of the belt in the helical path.

Belts 10 and 10' are particularly suited for use in helical tier systems 100 and 201. The maximum curvature of the system is located in the helical path and the spacing between the openings in links 14, 15, 16, 17 (and 40, if used), or between 14a, 15a and 16a, is correlated to the radius of curvature of the helical path. This assures non-collapse of the inner edge of the belt within the helical path, while at the same time assuring smooth operation of the belt along its outer edge.

As seen in FIG. 22, a helical conveying system includes an endless conveyor belt 10 (10', 10a), having a straight-line loading section 108, a helical path section 112 which constitutes a significant portion of the belt's total pathway and a straight-line discharge section 109. As seen in FIGS. 1 and 2, the belt has a plurality of transverse rods 12 extending from an inner lateral edge to an outer lateral edge of the belt. Rods 12 are interconnected by innermost inside links 14 near the ends thereof adjacent the inner lateral edge in a helical path section 112 such that there is substantially no provision for relative expansive longitudinal movement. In contrast, interconnections between links 16 and 17 and rods 12 along the outer edge of the belt 10 of FIGS. 1 and 2 permit relative expansive longitudinal movement of an amount sufficient to accommodate the increase in distance which occurs during the transition of the belt from its straight-line loading section 108 configuration to a curved configuration having a desired radius of curvature for the helical path section 112. As seen in FIGS. 1 and 2, the belt also includes outermost inside or third links 15 interconnected to adjacent transverse rods 12 and disposed outside of but directly adjacent the innermost inside or first links 14. Thus, the belt is constructed so that, in changing its orientation during the transition from the straight-line loading section to the helical path section, only longitudinal expansion of appropriate regions of the belt occurs.

The system can also include frictional (FIG. 22) or positive (FIG. 23) driving elements on the inside of the belt having vertical extending driving members 70 (FIGS. 19-21) for placing tension on the inner row of links 14' and 15'. One can also use a sprocket drive as in FIG. 15.

This invention has been described in detail in connection with the illustrated preferred embodiments. These embodiments, however, are merely for example only and the invention i snot restricted thereto. It will be easily understood by those skilled in the art that other variations and modifications can be easily made within the scope of this invention, as defined by the appended claims.

We claim:

1. A conveyor belt comprising:
   a plurality of rods extending transversely of the length of the belt between inside and outside edges of the belt;
   a plurality of first links disposed adjacent inside ends of said rods, each of said first links coupling adjacent rods to each other near the inside edge of said belt;
   a plurality of second links disposed adjacent outside ends of said rods, each of said second links coupling adjacent rods to each other near the outside edge of said belt; and
   a plurality of third links disposed outside of and adjacent said first links and coupling adjacent rods to each other, said first and third links keeping said rods substantially parallel to each other during straight-line conveying motion of said belt under tractive load;
   said belt constructed for holding said inside ends of said rods at a first pitch relative to each other during straight-line travel of said belt under tractive load, for holding said inside ends of said rods substantially at said first pitch relative to each other during curved travel of said belt and for allowing said outside ends of said rods to move to a second greater pitch relative to each other during said curved travel of said belt.

2. A conveyor belt as in claim 1, wherein, during straight-line conveying motion, said first and third links are tractive while aid second links are non-tractive and, during lateral curved conveying motion, at least said first or said third links remain tractive.

3. A conveyor belt as in claim 1, wherein said first and third links are substantially U-shaped links joining inside ends of adjacent rods, each of said U-shaped links having a pair of spaced leg portions extending generally in a lengthwise direction of the belt and a leg-connecting portion joining said spaced leg portions, and each of said leg portions having holes formed therethrough for receiving inside ends of said rods.

4. A conveyor belt as in claim 1, further comprising at least one support link disposed adjacent said first and third links, said support link contacts and supports an inside edge of an adjacent vertically spaced tier of said belt when said belt is arranged to travel along a helical converging path.

5. A conveyor belt as in claim 4, wherein said first and third links are U-shaped with one of said U-shaped links being disposed on either side of said support link.

6. A conveyor belt as in claim 1, wherein said second links include at least one bar link having holes for receiving and coupling adjacent pairs of said rods.

7. A conveyor belt as in claim 1, wherein each of said first and third links have holes with end surfaces spaced a predetermined distance apart and said holes are slightly oversized with respect to the cross-dimensional width of said rods.

8. A conveyor belt comprising:
   a plurality of rods extending transversely of the length of the belt between inside and outside edges of the belt;
   a plurality of first links disposed adjacent inside ends of said rods, each of said first links coupling adjacent rods to each other near the inside edge of said belt;
   a plurality of second links disposed adjacent outside ends of said rods, each of said second links coupling adjacent rods to each other near the outside edge of said belt; and
   a plurality of connectors, disposed outside of, separate from and adjacent said first links and coupling adjacent rods to each other, said connectors and said first links keeping said rods substantially parallel to each other during straight-line conveying motion of said belt under tractive load;
   said belt constructed for holding said inside ends of said rods at a first pitch relative to each other during straight-line travel of said belt under tractive load, for holding said inside ends of said rods substantially at said first pitch relative to each other during curved travel of said belt and for allowing said outside ends of said rods to move to a second greater pitch relative to each other during said curved travel of said belt.

9. A conveyor belt as in claim 8, wherein each of said first links further comprises a pair of legs extending generally lengthwise of the belt and coupling adjacent rods at spaced locations therealong.

10. A conveyor belt as in claim 9, wherein each of said connectors further comprises a pair of legs extending generally lengthwise of the belt and coupling adjacent rods at spaced locations therealong.

11. A conveyor belt as in claim 8, wherein said first links and said connectors are substantially U-shaped links joining inside ends of adjacent rods.

12. A conveyor belt as in claim 8, wherein each of said connectors is substantially U-shaped, and each of said U-shaped connectors further comprises a pair of leg portions extending generally lengthwise of the belt and a leg-connecting portion joining said leg portions, and each of said leg portions have holes formed therethrough for receiving adjacent rods.

13. A conveyor belt as in claim 8, wherein during straight-line conveying motion, said first links and said connectors are tractive while said second links are non-tractive and, during lateral curved conveying motion, at least said first links or said connectors remain tractive.

14. A conveyor belt as in claim 8, wherein said first links, said second links and said connectors are separate and distinct elements from said rods.

15. A conveyor belt as in claim 8, further comprising at least one support link disposed adjacent said first links and said connectors, said support link contacts and supports an inside edge of an adjacent vertically spaced tier of said belt when said belt is arranged to travel along a helical conveying path.

16. A conveyor belt as in claim 15, wherein said support link is coupled between pairs of said adjacent rods and said support link further comprises a longitudinal portion extending both longitudinally between a pair of adjacent rods and vertically away from said rods and at least one tab portion extending transversely from said longitudinal portion, said longitudinal portion having holes through which an adjacent pair of rods extend, said tab portions being spaced a predetermined vertical distance from said rods.

17. A conveyor belt as in claim 16, wherein;
said first links and said connectors are U-shaped links with one of said U-shaped links being disposed on either side of said support link; and
said U-shaped links further comprise a pair of spaced leg portions extending generally in the lengthwise direction of the belt and a leg-connecting portion joining said spaced leg portions, and said spaced leg portions of said U-shaped links have end sections adjacent to the longitudinal portion of said support link, with said end sections of said U-shaped links extending substantially perpendicular to the transverse extent of said rods to align said support link with respect to said rods.

18. A conveyor belt as in claim 16, wherein said at lest one tab portion further comprises first and second tab portions extending out from said longitudinal portion in opposite transverse directions.

19. A conveyor belt as in claim 16, wherein said longitudinal portion of said support link, has a lower section with holes for coupling to said rods and an upper section extending vertically and longitudinally from the lower section, said upper section being angularly offset from the lower section and having a longitudinal dimension such that upper sections of adjacent support links can overlap one another.

20. A conveyor belt as in claim 15, wherein said first links and said connectors are U-shaped links with one of said U-shaped links being disposed on either side of said support link.

21. A conveyor belt as in claim 8, wherein said second links further comprise at least one bar link having holes for receiving and coupling adjacent pairs of said rods.

22. A conveyor belt as in claim 8, wherein each of said first links and said connectors have holes slightly oversized with respect to the cross-dimensional width of said rods.

23. A conveyor belt as in claim 8, wherein said second links have longitudinal slots interconnecting said adjacent rods along the outside edge of said belt, said slots receive said transverse rods near the ends thereof and are of a sufficient length to allow the desired relative movement of said rods in changing from said straight-line travel of said belt to said curved travel of said belt.

24. A conveyor belt as in claim 8, wherein the ratio of an inside turn radius of said belt to a width of said belt is less than 1.4 to 1.

25. A conveying system comprising:
an endless conveyor belt being arranged in said system to define a straight-line section and a laterally curved section; and
means for driving said conveyor belt so that said belt follows along said straight-line section and then along said laterally curved section;
said belt including:
a plurality of rods extending transversely of the length of the belt between inside and outside edges of the belt;
a plurality of first links disposed adjacent inside ends of said rods, eahc of said first links coupling adjacent rods to each other near the inside edge of said belt;
a plurality of second links disposed adjacent outside ends of said rods, each of said second links coupling adjacent rods to each other near the outside edge of said belt;
a plurality of connectors, disposed outside of, separate from the adjacent said first links and coupling adjacent rods to each other, said connectors and said first links keeping said rods substantially parallel to each other during straight-line conveying motion of said belt under tractive load;
said belt constructed for holding said inside ends of said rods at a first pitch relative to each other during straight-line travel of said belt under tractive load, for holding said inside ends of said rods substantially at said first pitch relative to each other during curved travel of said belt and for allowing said outside ends of said rods to move to a second greater pitch relative to each other during said curved travel of said belt.

26. A conveying system as in claim 25, wherein said laterally curve section is helical.

27. A conveying system as in claim 26, wherein said belt driving means includes a rotatable drum mounted to rotate about a vertical axis, said drum including an outer surface which engages inner lateral edge regions of said belt.

28. A conveying system as in claim 26, wherein said belt driving means includes an internal rotating cage having a plurality of vertically extending driving members.

29. A conveying system as in claim 26, wherein said belt driving means drives said belt by relatively low tension.

30. A conveying system as in claim 26, wherein said laterally curved section forms a plurality of stacked tiers of the belt and said system further comprises at least one support link disposed adjacent said first links and said connectors, said support link contacts and supports an inside edge of an adjacent vertically spaced tier of said belt when said belt is arranged to travel along the laterally curved section.

31. A conveying system as in claim 26, wherein said belt driving means further comprises a rotating driving member frictionally engaging inner edge regions of said belt in the laterally curved section.

32. A conveying system as in claim 26, wherein said belt driving means further comprises a rotating driving member positively engaging inner edge regions of said belt in the laterally curved section.

33. A conveying system as in claim 25, wherein, during straight-line conveying motion, said first links and said connectors are tractive while said second links are non-tractive and, during lateral curved conveying motion, at least said first links or said connectors remain tractive.

34. A conveyor belt comprising:
a plurality of rods extending transversely of the length of the belt between inside and outside edges of the belt;

a plurality of first links disposed adjacent inside ends of said rods, each of said first links being U-shaped with spaced legs coupling adjacent rods to each other near the inside edge of said belt;

a plurality of second links disposed adjacent outside ends of said rods, each of said second links coupling adjacent rods to each other near the outside edge of said belt; and a plurality of connectors, disposed outside of and adjacent said first links and coupling adjacent rods to each other, said connectors and said first links keeping said rods substantially parallel to each other during straight-line conveying motion of said belt under tractive load;

said belt constructed for said inside ends of said rods at a first pitch relative to each other during straight-line travel of said belt under tractive load, for holding said inside ends of said rods substantially at said first pitch relative to each other during curved travel of said belt and for allowing said outside ends of said rods to move to a second greater pitch relative to each other during said curved travel of said belt.

35. A conveyor belt as in claim 34, wherein each of said connectors further comprises a pair of legs extending generally lengthwise of the belt and coupling adjacent rods at spaced locations therealong.

36. A conveyor belt as in claim 34, wherein each of said connectors is substantially U-shaped, and each of said U-shaped connectors further comprises a pair of leg portions extending generally lengthwise of the belt and a leg-connecting portion joining said leg portions, and each of said leg portions have holes formed therethrough for receiving adjacent rods.

37. A conveyor belt as in claim 34, wherein, during straight-line conveying motion, said first links and said connectors are tractive while said second links are nontractive and, during lateral curved conveying motion, at least said first links or said connectors remain tractive.

38. A conveyor belt as in claim 34, wherein said first links, said second links and said connectors are separate and distinct elements from said rods.

39. A conveyor belt as in claim 34, further comprising at least one support link disposed adjacent said first links and said connectors, aid support link contacts and supports an inside edge of an adjacent vertically spaced tier of said belt when said belt is arranged to travel along a helical conveying path.

40. A conveyor belt as in claim 39, wherein said support link is coupled between pairs of said adjacent rods and said support link further comprises a longitudinal portion extending both longitudinally between a pair of adjacent rods and vertically away from said rods and at least one tab portion extending transversely from said longitudinal portion, said longitudinal portion having holes through which an adjacent pair of rods extend, said tab portions being spaced a predetermined vertical distance from said rods.

41. A conveyor belt as in claim 40, wherein said at least one tab portion further comprises first and second tab portions extending out from said longitudinal portion in opposite transverse directions.

42. A conveyor belt as in claim 40, wherein said longitudinal portion of said support link has a lower section with holes for coupling to said rods and an upper section extending vertically and longitudinally from the lower section, said upper section being angularly offset from the lower section and having a longitudinal dimension such that upper sections of adjacent support links can overlap one another.

43. A conveyor belt as in claim 39, wherein said connectors are U-shaped links with one of said first link and connector U-shaped links being disposed on either side of said support link.

44. A conveyor belt as in claim 34, wherein said second links further comprise at least one bar link having holes for receiving and coupling adjacent pairs of said rods.

45. A conveyor belt as in claim 34, wherein each of said first links and said connectors have holes slightly oversized with respect to the cross-dimensional width of said rods.

46. A conveyor belt as in claim 34, wherein said second links have longitudinal slots interconnecting said adjacent rods along the outside edge of said belt, said slots receive said transverse rods near the ends thereof and are of a sufficient length to allow the desired relative movement of said rods in changing from said straight-line travel of said belt to said curved travel of said belt.

47. A conveyor belt as in claim 34, wherein the ratio of an inside turn radius of said belt to a width of said belt is less than 1.4 to 1.

48. A conveying system comprising:

an endless conveyor belt being arranged in said system to define a straight-line section and a laterally curved section; and means for driving said conveyor belt so that said belt follows along said straight-line section and then along said laterally curved section;

said belt including:

a plurality of rods extending transversely of the length of the belt between inside and outside edges of the belt;

a plurality of first links disposed adjacent inside ends of said rods, each of said first links being U-shaped with spaced legs coupling adjacent rods to each other near the inside edge of said belt;

a plurality of second links disposed adjacent outside ends of said rods, each of said second links coupling adjacent rods to each other near the outside edge of said belt;

a plurality of connectors, disposed outside of and adjacent said first links and coupling adjacent rods to each other, said connectors and said first links keeping said rods substantially parallel to each other during straight-line conveying motion of said belt under tractive load;

said belt constructed for holding said inside ends of said rods at a first pitch relative to each other during straight-line travel of said belt under tractive load, for holding said inside ends of said rods substantially at said first pitch relative to each other during curved travel of said belt and for allowing said outside ends of said rods to move to a second greater pitch relative to each other during said curved travel of said belt.

49. A conveying system as in claim 48, wherein said laterally curved section is helical.

50. A conveying system as in claim 49, wherein said belt driving means includes a rotatable drum mounted to rotate about a vertical axis, said drum including an outer surface which engages inner lateral edge regions of said belt.

51. A conveying system as in claim 49, wherein said belt driving means includes an internal rotating cage having a plurality of vertically extending driving members.

52. A conveying system as in claim 49, wherein said belt driving means drives said belt by relatively low tension.

53. A conveying system as in claim 49, wherein said laterally curved section forms a plurality of stacked tiers of the belt and said system further comprises at least one support link disposed adjacent said first links and said connectors, said support link contacts and supports an inside edge of an adjacent vertically spaced tier of said belt when said belt is arranged to travel along the laterally curved section.

54. A conveying system as in claim 49, wherein said belt driving means further comprises a rotating driving member frictionally engaging inner edge regions of said belt in the laterally curved section.

55. A conveying system as in claim 49, wherein said belt driving means further comprises a rotating driving member positively engaging inner edge regions of said belt in the laterally curved section.

56. A conveying system as in claim 48, wherein, during straight-line conveying motion, said first links and said connectors are tractive while said second links are non-tractive and, during lateral curved conveying motion, at least said first links or said connectors remain tractive.

* * * * *